US010664839B2

(12) United States Patent
Modi et al.

(10) Patent No.: US 10,664,839 B2
(45) Date of Patent: May 26, 2020

(54) METHOD AND SYSTEM FOR AUTHORIZATION OF MULTIPLE TRANSACTIONS USING A SINGLE AUTHENTICATION PROCESS

(71) Applicant: MasterCard International Incorporated, Purchase, NY (US)

(72) Inventors: Rohit Modi, New Delhi (IN); Ashutosh Gupta, Varanasi Uttar Pradesh (IN); Dinesh Kumar Lal, Gurgaon Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 522 days.

(21) Appl. No.: 15/271,725

(22) Filed: Sep. 21, 2016

(65) Prior Publication Data
US 2018/0082298 A1 Mar. 22, 2018

(51) Int. Cl.
*G06Q 20/34* (2012.01)
*G06Q 20/40* (2012.01)
*H04L 29/06* (2006.01)

(52) U.S. Cl.
CPC ........ *G06Q 20/4014* (2013.01); *G06Q 20/34* (2013.01); *G06Q 20/35785* (2013.01); *G06Q 20/40* (2013.01); *G06Q 20/405* (2013.01); *H04L 63/083* (2013.01); *H04L 2463/102* (2013.01)

(58) Field of Classification Search
None
See application file for complete search history.

(56) References Cited

U.S. PATENT DOCUMENTS

| 7,389,275 | B2 | 6/2008 | Kemper et al. |
| 8,117,127 | B1* | 2/2012 | Sanders ............. G06Q 20/1085 |
| | | | 705/30 |
| 2014/0136411 | A1* | 5/2014 | Cho ........................ G06F 21/35 |
| | | | 705/44 |
| 2017/0017958 | A1* | 1/2017 | Scott ...................... G06Q 20/40 |

FOREIGN PATENT DOCUMENTS

| EP | 2605203 A1 | 6/2013 |
| EP | 2819076 A1 | 12/2014 |

OTHER PUBLICATIONS

International Search Report and Written Opinion issued by the International Search Authority dated Aug. 17, 2017 in corresponding PCT Application No. PCT/US2017/034958 (12 pages).

* cited by examiner

*Primary Examiner* — Joseph W. King
(74) *Attorney, Agent, or Firm* — Buchanan Ingersoll & Rooney PC

(57) ABSTRACT

A method for authorization of multiple transactions using a single authentication process is described. The method includes determining that a user is an authorized user based on user credentials associated with the user; authorizing a transaction device identified by the authorized user for future electronic transactions with one or more restrictions; and providing previously stored payment card information associated with a user account of the authorized user for electronic transactions initiated at the authorized transaction device in accordance with the one or more restrictions.

10 Claims, 7 Drawing Sheets

METHOD AND SYSTEM FOR AUTHORIZATION OF MULTIPLE TRANSACTIONS USING A SINGLE AUTHENTICATION PROCESS

FIELD

The present disclosure relates to a method and system for authorization of multiple transactions using a single authentication process.

BACKGROUND

A tremendous amount of transactions are conducted online or by using an electronic device for the transaction at a point of sale, rather than in person at a point of sale. Examples of such electronic devices include smartphones, laptop computers, tablet computers, etc. On each of these devices, the consumer may be required to separately verify his/her identity while conducting the transaction. For example, the consumer may be prompted to input his/her credentials, e.g., account name and password, on an electronic device to initiate the transaction.

However, in some scenarios, the consumer may be repeatedly required to verify his/her identity for multiple, separate transactions on different websites or different point of sale locations. For example, a consumer may plan to conduct multiple online transactions including paying the monthly mobile phone bill, paying the electricity bill, purchasing a gift for a cousin, and purchasing a pair of shoes. The multiple online transactions may be completed on different websites and may utilize different devices. Thus, the consumer may be required to verify his/her identity every time the consumer proceeds to the payment portion of the transaction. This inconveniences the user by requiring the user to authenticate himself or herself for each transaction with repetitious entry of the consumer's authentication information. These inconvenient and repeated authentication techniques are commonly implemented and thought to be essential in preventing fraud. In other scenarios, a friend or family member of the consumer may be in an urgent need of a method for payment. The consumer may be willing to authorize payment on behalf of the friend or family member, but simply sending payment information to the friend or family member via texts, emails, or other messages exposes the payment information to other forms of abuse and fraud. As such, there is a need for a technical solution to provide a method and system for authorization of multiple transactions using a single authentication process.

SUMMARY

The present disclosure provides a description of systems and methods for authorization of multiple transactions using a single authentication process.

For example, a method for authorization of multiple transactions using a single authentication process, may include: determining that a user is an authorized user based on user credentials associated with the user; authorizing a transaction device identified by the authorized user for future electronic transactions with one or more restrictions; and providing previously stored payment card information associated with a user account of the authorized user for electronic transactions initiated at the authorized transaction device in accordance with the one or more restrictions.

Further, the method may be embodied in a system for authorization of multiple transactions using a single authentication process, comprising: an authenticator configured to determine that a user is an authorized user based on user credentials associated with the user; an authorizer configured to authorize a transaction device identified by the authorized user for future electronic transactions with one or more restrictions; and a data signal generator configured to provide previously stored payment card information associated with a user account of the authorized user for electronic transactions initiated at the authorized transaction device in accordance with the one or more restrictions.

Another example method for authorization of multiple transactions using a single authentication process, may include receiving, at a transaction device, an indication that the transaction device is authorized by an authorized user for future electronic transactions with one or more restrictions; receiving, at the transaction device, payment card information associated with a user account of the authorized user; and providing the payment card information in accordance with the one or more restrictions when the transaction device initiates transaction requests.

The example method may be embodied in a system for authorization of multiple transactions using a single authentication process, comprising a receiver configured to receive an indication that the device is authorized by an authorized user for future electronic transactions with one or more restrictions, wherein the receiver is further configured to receive payment card information associated with a user account of the authorized user; and a data signal generator configured to provide the payment card information in accordance with the one or more restrictions when the device initiate transaction requests.

BRIEF DESCRIPTION OF THE DRAWINGS

The scope of the present disclosure is best understood from the following detailed description of exemplary embodiments when read in conjunction with the accompanying drawings. Included in the drawings are the following figures.

Figure 1A:
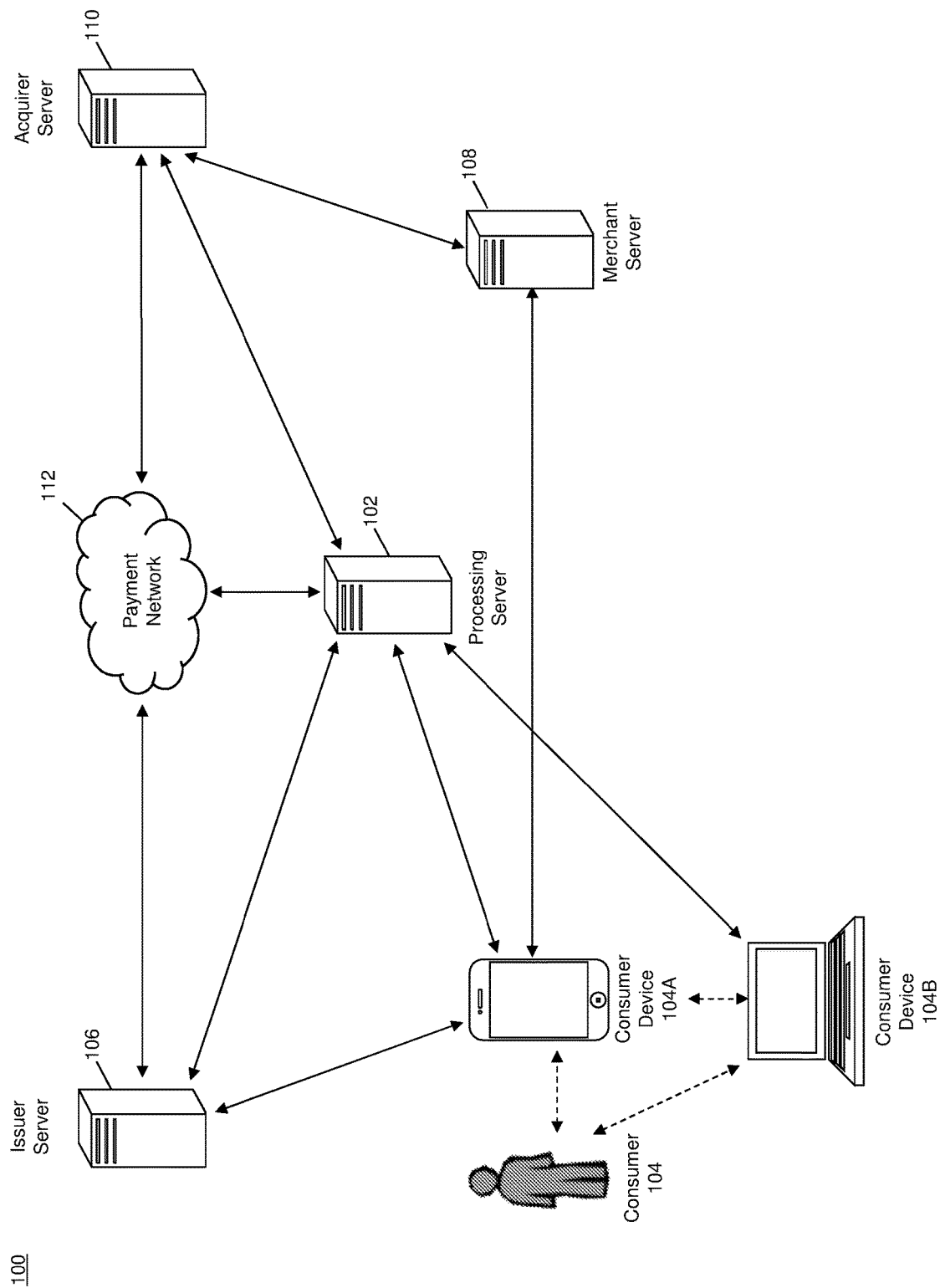
FIG. 1A is a block diagram illustrating a high level system architecture for authorization of multiple transactions using a single authentication process in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards (e.g., credit cards, prepaid cards, debit cards, merchant cards, chip and pin cards, payment credentials on mobile devices that may employ near-field communication (NFC), physical and virtual cards, etc.), letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have and require special knowledge in offered products. In some embodiments, an entity involved in a single transaction may be considered a merchant. In some instances, as used herein, the term "merchant" may refer to an apparatus or device of a merchant entity.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Figure 5:
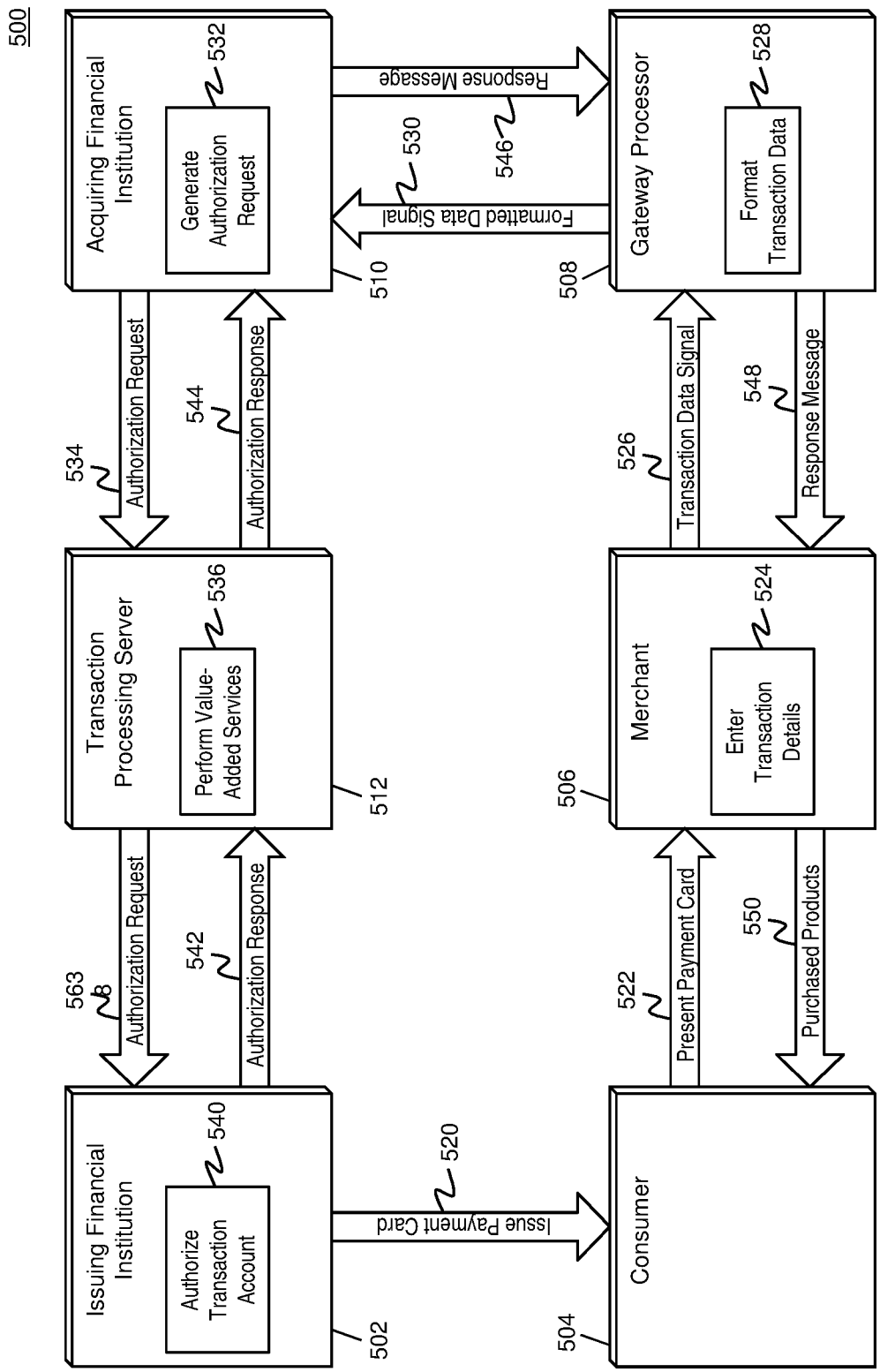
FIG. 5 is a flow diagram illustrating a process for the processing of a payment transaction in accordance with exemplary embodiments.

Systems for Authorization of Multiple Transactions Using a Single Authentication Process As depicted in greater detail with respect to FIG. 5, typically the consumer 104 conducts a payment transaction by presenting his or her payment information to a merchant 506 (step 522). During in person transactions, the consumer 104 will simply present their payment card. Typically, when making online transactions the consumer 104 will enter their authentication information and then, if necessary, supply payment information to complete the transaction. As described above, however, the consumer 104 will need to repeatedly enter their authentication information and payment information to complete the transaction. As described above, however, conventionally the consumer 104 will need to repeatedly enter their authentication information and payment information to complete the transaction. FIG. 1A is a block diagram illustrating a high level system architecture for authorization of multiple transactions using a single authentication process in accordance with exemplary embodiments.

The system 100 may include a processing server 102 configured to provide authorization of multiple transactions using a single authentication process via a first consumer device 104A and/or a second consumer device 104B. Consumer devices 104A, 104B may refer to an electronic device that a consumer has access to or control over, e.g., smartphones, tablets, laptops, desktop computers, smart watches, wearable computing devices, implantable computing devices, etc. For purposes of this application, consumer devices 104A, 104B also include a unique identifier that is tied to the device. By way of the unique identifier, the system 100 described here can reliably identify devices 104A, 104B the consumer 104 has authorized for payment. In the depicted embodiment, the consumer 104 has authenticated himself or herself on at least one of the devices 104A, 104B. The unique identifier may be any suitable identification value that is uniquely associated with the consumer device, such as an identification number, serial number, registration number, media access control address, internet protocol address, username, email address, telephone number, etc.

Figure 3:
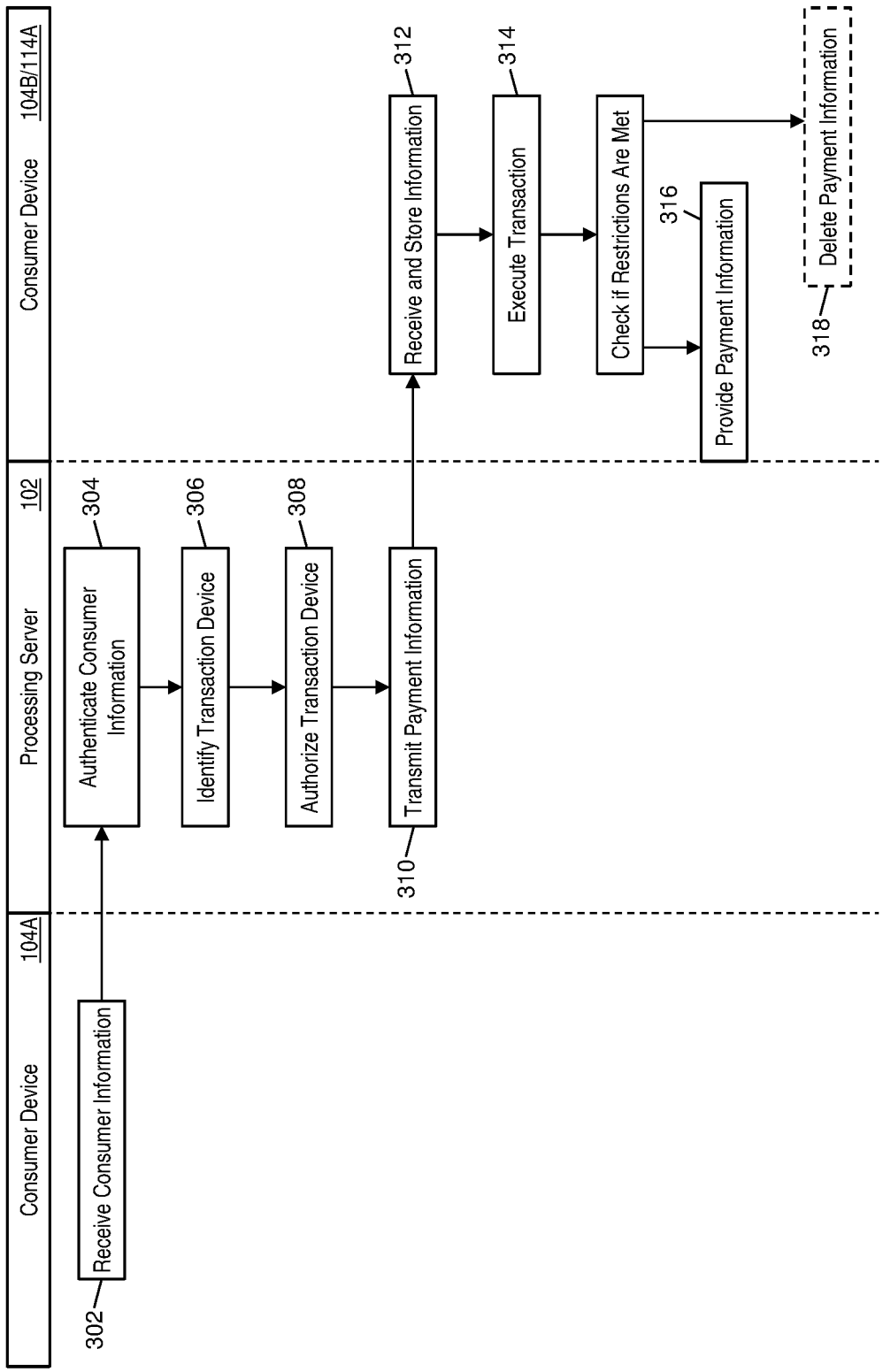
FIG. 3 is a flow diagram illustrating the process of authorization of multiple transactions using a single authentication process in accordance with exemplary embodiments.

The consumer 104 intends to initiate one or more transactions using applications or websites executing on either the first consumer device 104A or the second consumer device 104B. Rather than manually inputting payment information for each application or website for each intended transaction, by using the system 100 described here the consumer 104 may instead authorize the first consumer device 104A, the second consumer device 104B, or both devices 104A, 104B. Once authorized, applications or websites executed on the authorized devices 104A, 104B will receive payment information without requiring reentry of authentication or payment information for each transaction. The authorization may include, in some embodiments, certain restrictions that, when met, result in the device being deauthorized. By employing the system 100 described herein, the consumer 104 need not repetitively enter authentication information to conduct a transaction. Rather, the consumer 104 will only need to authenticate and provide information once and authenticate transaction devices 104A, 104B An example usage scenario of the system 100 will now be described as shown in FIGS. 1A and 3. The consumer 104 may authorize the use of device 104B to provide payment information to applications or websites executing on the device 104B for a predefined duration of time, for a predetermined total monetary amount, for a predetermined number of merchants, or for a predetermined number of transactions. In this example, the consumer 104 provides information for transmission by a consumer device (first device) 104A so that the transaction device (second device) 104B (step 302) may become a device that is authorized to submit the payment information for the consumer 104. This information includes authentication credentials, the unique identifier of the device 104B to be authorized, and the restrictions to be imposed on the device 104B if authorized. This information may be entered into an application at the consumer device 104A. The authentication credentials may be a user name and password, biometric authentication such as a fingerprint, or other information that allows for the consumer 104 to demonstrate that he or she is the owner associated with the payment information to be used by the second device 104B. In this example, the processing server 102 receives the information and authenticates the consumer 104 using the authentication credentials (step 304). The authentication of the consumer 104 may be done against an account database associated with a financial institution or with a separate entity. Once the processing server 102 authenticates the consumer 104, the processing server 102 attempts to identify the transaction device 104B (step 306). The processing server 102 relies on the unique identifier submitted by the consumer 104 to identify the transaction device 104B. Once the processing server 102 has identified the transaction device 104B, the processing server 102 authorizes the transaction device 104B to supply the payment information from the consumer 104. Any restrictions included with the information submitted by the consumer 104 are forwarded to the transaction device 104B for enforcement (step 308). In addition, the processing server 102 will also forward the payment information from the consumer 104 so that the transaction device 104B may execute the transactions (step 310). The transaction device 104B receives and stores the payment information (step 312). When the transaction device 104B encounters a transaction requiring payment information (step 314), the transaction device 104B checks if the restrictions associated with the transaction device 104B have been met (step 316). For example, the consumer 104 may only authorize two transactions to be executed within ten minutes on the transaction device 104B. The transaction device 104B would then check, prior to conducting any transactions that require payment information, whether the two allowed transactions to be executed within ten minutes have already been completed (step 316). If the restrictions have not yet been met, the transaction device 104B will submit the payment information from the consumer 104 (step 318). In addition, the transaction device 104B will record the completion of the transaction (step 318). If the restrictions have, however, been met, the transaction device 104B will delete the payment information from storage (step 320). In addition, the transaction device 104B may present a notification stating that the device is no longer authorized to conduct transactions with the payment information from the consumer 104.

Variations of this configuration are contemplated. For example, the first device 104A may, in certain embodiments, contain the information necessary to authenticate the consumer 104. Alternatively, the first device 104A may query a data source with the necessary information so that it may authenticate the consumer 104 without relying on the processing server 102. In such an embodiment, the first device 104A will authenticate the consumer information (step 304). Further, in some embodiments the first device 104A will incorporate the functionality of the processing server 102 (e.g., steps 304, 306, 308, 310) and directly communicate with the at least one transaction devices 104B, including payment information. In other embodiments, the processing server 102 will transmit the payment information to the transaction device 104B.

Figure 1B:
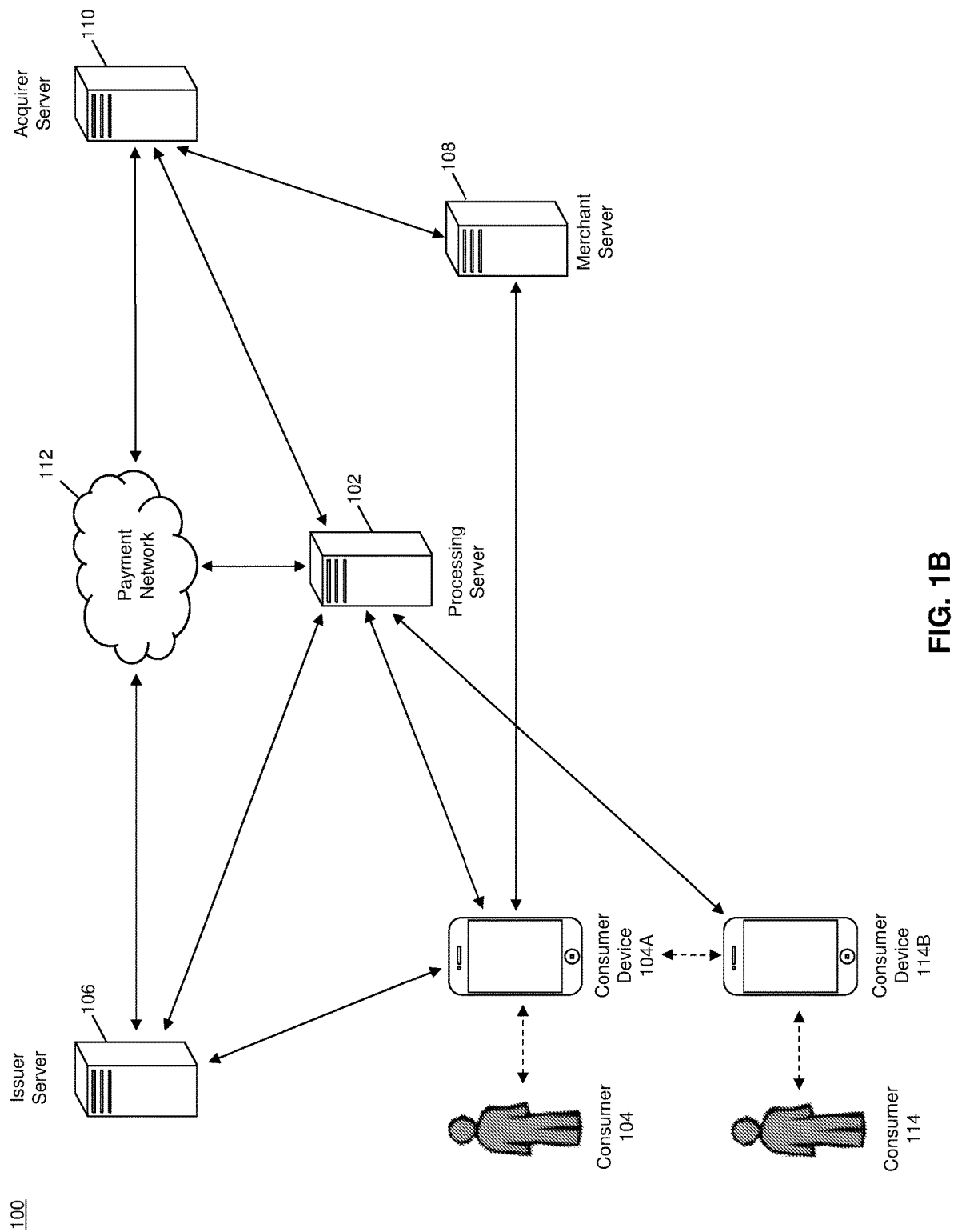
FIG. 1B is a block diagram illustrating another high level system architecture for authorization of multiple transactions using a single authentication process in accordance with exemplary embodiments.

FIG. 1B is a block diagram illustrating another embodiment of the system 100. Instead of authorizing device 104B to conduct transactions, in this example the consumer 104 has authorized another consumer 114 to conduct transactions on device 114B. This is because, unlike in the above described example, the transaction device 114B is possessed by another consumer 114 who is trusted by consumer 104. For example, the consumer 104 may be a parent and the other consumer 114 their child, consumer 104 may be an employer and the other consumer 114 the employee, etc. For purposes of this description the differences between the scenario shown in FIGS. 1A, 1B will be described.

Unlike to the embodiment depicted in FIG. 1A, the consumer authorizes a transaction 114A possessed by the other consumer 114. In this situation, in accordance with the depiction in FIG. 3, the consumer 104 authorizes the device 114B for transacting on his or her behalf. The consumer 114 may be a close friend, a trusted confidant, a family member, or another trusted individual. In some situations, the consumer 114 may be a person legally empowered to transact on behalf of consumer 104. Similar to the embodiment in FIG. 1A, the consumer 104 authorizes a device 114B to be the transaction device. In some embodiments, consumer 114 will be required to authenticate with the device 114B so that payments may be conducted on behalf of consumer 104. Similar to the embodiment described above, the process depicted in FIG. 3 is applicable to situations when consumer 104 with device 104A delegates responsibility for submitting payment information to consumer 114 with device 114B.

Accordingly, FIG. 1A depicts a scenario where the consumer 104 seeks to authorize one of their own devices 104B. FIG. 1B depicts a scenario where the consumer 104 seeks to authorize devices 114B owned by another consumer 114 trusted by the consumer 104. Although FIGS. 1A, 1B depict embodiments of the described system, other combinations where a first user authorizes the use of transaction devices, even if the transaction devices are not owned by the consumer 104, may also be suitable for performing the functions discussed herein.

Components of the system 100 will now be described.
Processing Server

Processing server 102 acts as an intermediary between the consumer device 104A and other devices 104B, 114B.

Although not specifically required in embodiments of the system 100 described herein, certain functions performed by the processing server 102 may be centralized for efficiency reasons. Furthermore, in some embodiments, functions of the processing server 102 discussed herein may be performed by the consumer device 104A, which may include the components of the processing server 102 illustrated in FIG. 2A and discussed below, or may include components configured to perform the functions of the components of the processing server 102 as discussed below.

Figure 2A:
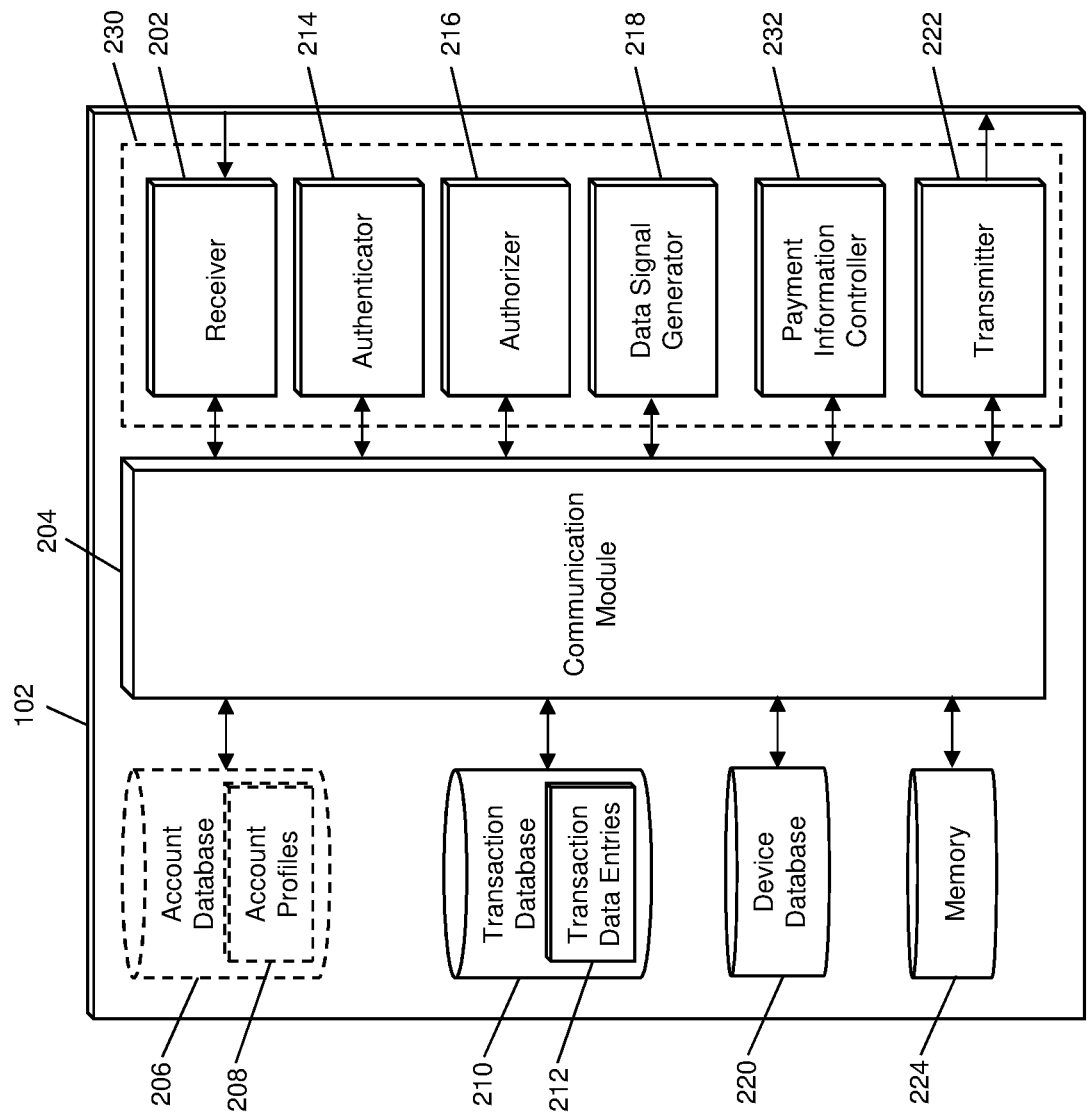
FIG. 2A is a block diagram illustrating a consumer device of FIGS. 1A, 1B for authorization of multiple transactions using a single authentication process in accordance with exemplary embodiments.

The processing server 102 shown in FIG. 2A includes components such as the account database 206 and account profiles 208. This information may be used, for example, to authenticate the consumer 104 attempting to utilize the system described here. The transaction database 210 contains transaction data entries 212 which record the number of transactions conducted by devices 104B, 114B. Such information may be used, for example, as a means for verifying the transactions identified by a transaction device 104A, 104B, 114B. Although the example described above contemplates each of the transaction devices 104A, 104B, 114B conducting the transaction, when multiple transaction devices 104A, 104B, 114B are authorized to execute transactions, embodiments may employ the processing server 102 and transaction database 210 to determine, in aggregate, if restrictions imposed by consumer 104 have been reached. Such coordination with the processing server 102 allows for the devices 104A, 104B, 114B to recognize and respect the restrictions defined by consumer 102 without directly communicating with each other. In such an instance, however, it is desirable for the processing server 102 to be in periodic if not constant communication with the devices 104A, 104B, 114.

The processing server 102 depicted in FIG. 2A also includes a device database 220. The device database 220 may provide an easy means by which the processing server 102 may record whether a device 104A, 104B, 114B is authorized to conduct transactions on behalf of the consumer 104. Similar to the above described transaction database, embodiments may employ the processing server 102 device database 220 to determine if a particular device remains authorized to conduct transactions. Similar to the transaction database 210, such a configuration for the processing server 102 is useful in a situation where the devices 104A, 104B, 114B do not directly communicate with each other. Rather, the devices 104A, 104B, 114B communicate either periodically or constantly with the processing server to ensure they remain authorized.

The processing server 102 uses the transmitter 222 and the receiver 202 to communicate with external components of the system 100 including devices 104A, 104B, 114B. Such communications may occur over both wired and wireless mediums. The processing server 102 includes a data signal generator 218 which may be used to encode information onto particular signals for transmission. For example, the data signal generator may encode payment information for transmission to a device 104A, 104B, 114B.

The processing server includes an authenticator 214 which validates the credentials presented by a consumer 104. The authenticator 214 may compare the credentials against the information stored in the account database 206, for example. The authenticator 214 may also contact external data sources in order to authenticate the credentials being presented by the consumer 104.

The processing server 102 also includes an authorizer 216, which will both identify and authorize certain devices 104A, 104B, 114B for conducting transactions on behalf of the consumer 104. In some embodiments, the authorizer 216 will transmit a specific coded sequence to indicate to a particular device 104A, 104B, 114B that the device may rely on the prior authentication by the consumer 104 with another device. The authorizer may also confirm that the particular unique identifier for the device 104A, 104B, 114B corresponds to the device desired by the consumer 104.

The processing server 102 also may comprise a payment information controller 232, which controls access to the payment information of the consumer 104. In some embodiments, the devices 104A, 104B, 114B may not include capabilities for securely storing payment information. In such an embodiment, the processing server 102 transmits payment information to the device 104A, 104B, 114B as needed. In another embodiment, the processing server 102 stores the payment information for transmission and storage at the device 104A, 104B, 114B. By including this component, the system 100 described here accommodates devices with such a secure data storage system, and devices lacking such systems. In addition, the payment information controller 232 will prevent access by devices 104A, 104B, 114B that have exceeded their restrictions.

Each of the described components of the processing server 102 communicate with one another through a communications module 204. Further, the processing server 102 includes memory 224 for storing information, such as the above described databases and additional information that may be suitable in performing the functions discussed herein, such as encryption keys and algorithms, etc. In addition, the processing server 102 includes a processor 230 which may execute the functions of the processing server 102.

Consumer Device

Figure 2B:
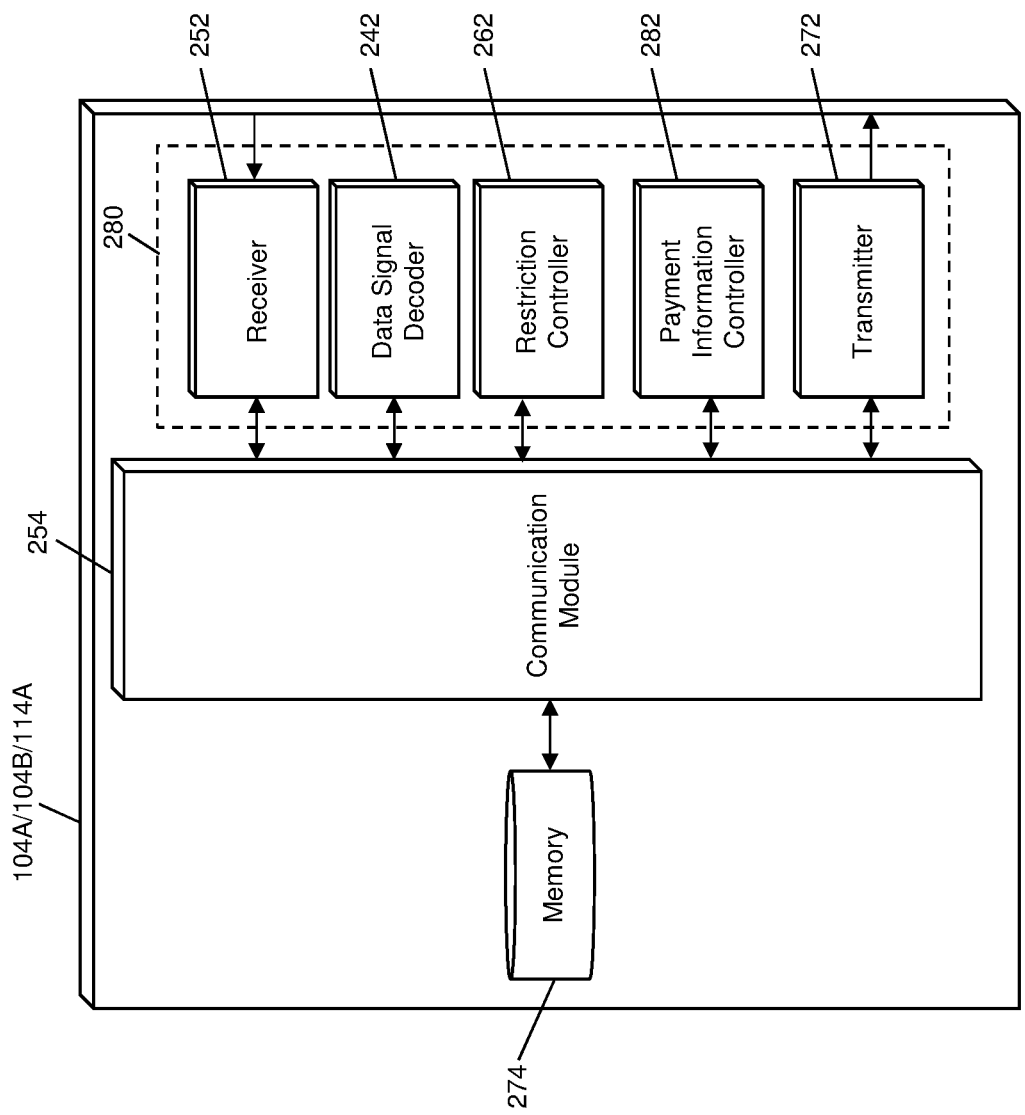
FIG. 2B is a block diagram illustrating another consumer device of FIG. 1 for authorization of multiple transactions using a single authentication process in accordance with exemplary embodiments.

FIG. 2B is a block diagram illustrating the consumer device 104A of FIG. 1A for authorization of multiple transactions using a single authentication process. Other consumer devices 104B, 114B are configured similarly, but not explicitly described here.

It will be apparent to persons having skill in the relevant art that the embodiment of the consumer device 104A illustrated in FIG. 2B is provided as illustration only and may not be exhaustive to all possible configurations of the consumer device 104A suitable for performing the functions as discussed herein.

The consumer device 104A may include a processor 280. The processor 280 may be configured to perform the functions of the consumer device 104A discussed herein as will be apparent to persons having skill in the relevant art. The processor 280 may utilize memory 274 when executing its instructions. The consumer device 104A also includes a transmitter 272 and a receiver 252 for transmitting and receiving data signals and other information using suitable communication methods and networks. In addition, the consumer device 104A includes a data signal decoder 242 which may be used to decode information from signals received from other sources. For example, the data signal generator may decode transmissions from the processing server 102.

Many existing consumer devices already include certain identifiers including a media access control (MAC) address, a serial number, a device identifier, an international mobile subscriber identity (IMSI), an integrated circuit card identifier (ICCID), and an international mobile equipment identity (IMEI), among others. At least one of these identifiers may be used to uniquely identify the authorized consumer devices 104A, 104B. In some embodiments, a combination of multiple identifiers is used to generate the unique identifier for the device 104A, 104B. For example, a hash function may be applied to a combination of the MAC address, the serial number, the device identifier, and the IMSI to create a unique identifier for the device 104A, 104B. In other embodiments, a unique identifier may be assigned to a device that includes at least one identifier such as a MAC address, the serial number, the device identifier, and the IMSI. Other techniques for combining identifiers to generate a unique identifier are contemplated but not explicitly described here.

Further to the example embodiment, the receiver 252 may be configured to receive (e.g., from input devices of the consumer device 104A) credentials to verify the identity of the consumer 104. The credentials may include a combination of a user name and a password input by the consumer 104. Alternatively or additionally, the user credentials may include biometric information, e.g., fingerprints, collected from the consumer 104 by a biometric information collector (not shown) connectively communicated to the consumer device 104A.

Upon receiving the user credentials, the authenticator 214 of the processing server 102 determines whether a consumer 104 is an authorized user. For example, the authenticator 214 may be configured to compare the received user credentials to the account profiles 208.

Once a certain device 104A, 104B, 114B is authorized, a set of restrictions, if applicable, is transmitted to the device 104A, 104B, 114B. Such restrictions are managed by the restriction controller 262 which determines if the defined restrictions have been exceeded through operation of the device 104A, 104B, 114B. For example, the restrictions may include, but not limited to, that transactions must be within a time limit on any future authorization after authorizing the transaction device, transactions must be limited to one or more predetermined merchants, transactions must be equal to or less than a maximum amount per transaction that the consumer 104 specifies on the consumer device 104A, a maximum number of transactions that the identified consumer device can initiate in a given time frame, and a maximum total amount for a plurality of transaction that the identified consumer device can initiate within a time limit. The restriction controller 262 considers these restrictions and if the restrictions are met or exceeded, the restriction controller 262 deletes the payment information to prevent the device 104A, 104B, 114B from conducting further transactions.

Figure 4:
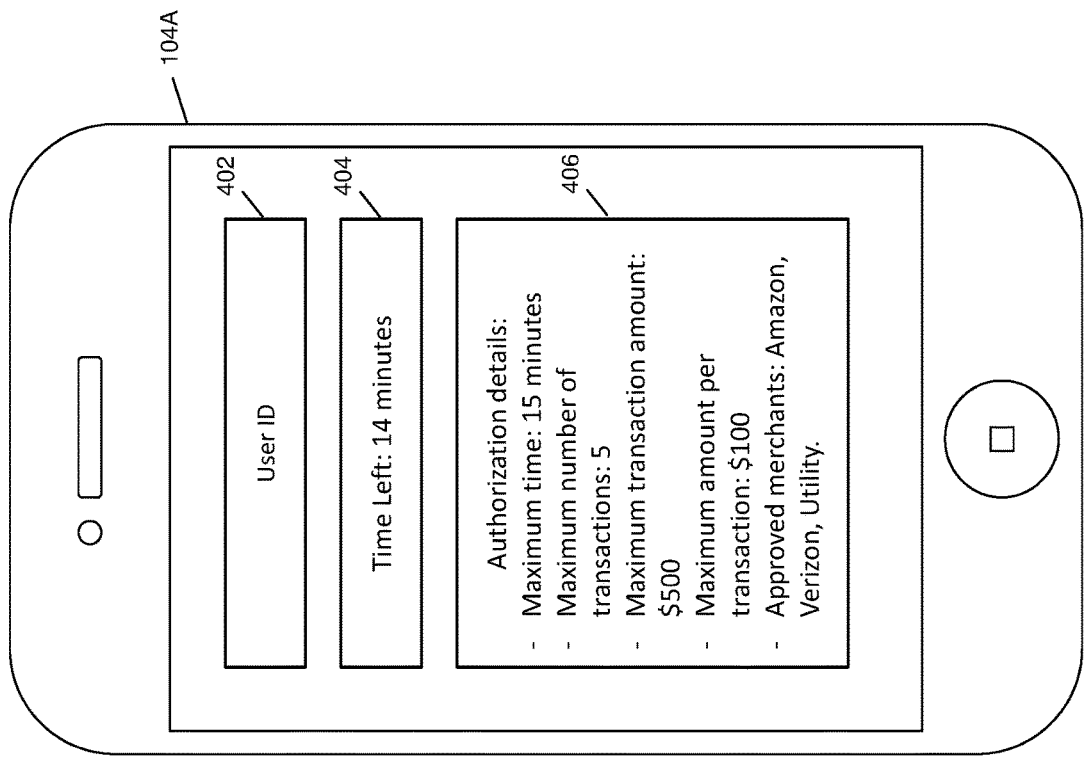
FIG. 4 illustrates a depiction of an interface where the consumer may define restrictions for a transaction device in accordance with exemplary embodiments.

FIG. 4 is a diagram illustrating a graphic user interface 400 of authorization of multiple transactions. While the graphic user interface 400 is illustrated as an interface of the consumer device 104A, it will be apparent to persons having skill in the relevant art that the graphic user interface 400 may be an interface of the devices 104B and 114B, and that other interfaces may be used in performing the functions discussed herein.

As depicted, graphic user interface 400 may include a graphic element 402 displaying a user ID, a graphic element 404 displaying time remaining before the authorization of the consumer device expires, e.g., 14 minutes as shown, and a graphic element 406 displaying authorization details including authorization details, e.g., the maximum time for the authorization: 15 minutes, the maximum number of transactions: 5, the maximum transaction amount: $500, the maximum amount per transaction: $100, approved merchants: Utility®, Verizon®, and Amazon®. Such a screen may be used by the consumer 104 to authorize devices 104B, 114B for either use by the consumer 104 or another consumer 114.

Payment Transaction Processing

FIG. 5 illustrates a transaction processing system and a process 500 for the processing of payment transactions in the system, which may include the processing of thousands, millions, or even billions of transactions during a given period (e.g., hourly, daily, weekly, etc.). The process 500 and steps included therein may be performed by one or more components of the system 100 discussed above, such as the consumer 104, other consumer 114, consumer devices 104A, 104B, 114B, processing server 102, issuer server 106, merchant server 108, acquirer server 110, payment network 112, etc. The processing of payment transactions using the system and process 500 illustrated in FIG. 5 and discussed below may utilize the payment rails, which may be comprised of the computing devices and infrastructure utilized to perform the steps of the process 500 as specially configured and programmed by the entities discussed below, including the transaction processing server 512, which may be associated with one or more payment networks configured to processing payment transactions. It will be apparent to persons having skill in the relevant art that the process 500 may be incorporated into the processes illustrated in FIG. 3, discussed above, with respect to the step or steps involved in the processing of a payment transaction. In addition, the entities discussed herein for performing the process 500 may include one or more computing devices or systems configured to perform the functions discussed below. For instance, the merchant 506 may be comprised of one or more point of sale devices, a local communication network, a computing server, and other devices configured to perform the functions discussed below.

In step 520, an issuing financial institution 502 may issue a payment card or other suitable payment instrument to a consumer 504. The issuing financial institution may be a financial institution, such as a bank, or other suitable type of entity that administers and manages payment accounts and/or payment instruments for use with payment accounts that can be used to fund payment transactions. The consumer 504 may have a transaction account with the issuing financial institution 502 for which the issued payment card is associated, such that, when used in a payment transaction, the payment transaction is funded by the associated transaction account. In some embodiments, the payment card may be issued to the consumer 504 physically. In other embodiments, the payment card may be a virtual payment card or otherwise provisioned to the consumer 504 in an electronic format.

In step 522, the consumer 504 may present the issued payment card to a merchant 506 for use in funding a payment transaction. The merchant 506 may be a business, another consumer, or any entity that may engage in a payment transaction with the consumer 504. The payment card may be presented by the consumer 504 via providing the physical card to the merchant 506, electronically transmitting (e.g., via near field communication, wireless transmission, or other suitable electronic transmission type and protocol) payment details for the payment card, or initiating transmission of payment details to the merchant 506 via a third party. The merchant 506 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 524, the merchant 506 may enter transaction details into a point of sale computing system. The transaction details may include the payment details provided by the consumer 504 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 506 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 506 may be an online retailer in an e-commerce transaction. In such embodiments, the transaction details may be entered in a shopping cart or other repository for storing transaction data in an electronic transaction as will be apparent to persons having skill in the relevant art.

In step 526, the merchant 506 may electronically transmit a data signal superimposed with transaction data to a gateway processor 508. The gateway processor 508 may be an entity configured to receive transaction details from a merchant 506 for formatting and transmission to an acquiring financial institution 510. In some instances, a gateway processor 508 may be associated with a plurality of merchants 506 and a plurality of acquiring financial institutions 510. In such instances, the gateway processor 508 may receive transaction details for a plurality of different transactions involving various merchants, which may be forwarded on to appropriate acquiring financial institutions 510. By having relationships with multiple acquiring financial institutions 510 and having the requisite infrastructure to communicate with financial institutions using the payment rails, such as using application programming interfaces associated with the gateway processor 508 or financial institutions used for the submission, receipt, and retrieval of data, a gateway processor 508 may act as an intermediary for a merchant 506 to be able to conduct payment transactions via a single communication channel and format with the gateway processor 508, without having to maintain relationships with multiple acquiring financial institutions 510 and payment processors and the hardware associated thereto. Acquiring financial institutions 510 may be financial institutions, such as banks, or other entities that administers and manages payment accounts and/or payment instruments for use with payment accounts. In some instances, acquiring financial institutions 510 may manage transaction accounts for merchants 506. In some cases, a single financial institution may operate as both an issuing financial institution 502 and an acquiring financial institution 510.

The data signal transmitted from the merchant 506 to the gateway processor 508 may be superimposed with the transaction details for the payment transaction, which may be formatted based on one or more standards. In some embodiments, the standards may be set forth by the gateway processor 508, which may use a unique, proprietary format for the transmission of transaction data to/from the gateway processor 508. In other embodiments, a public standard may be used, such as the International Organization for Standardization's ISO 8583 standard. The standard may indicate the types of data that may be included, the formatting of the data, how the data is to be stored and transmitted, and other criteria for the transmission of the transaction data to the gateway processor 508.

In step 528, the gateway processor 508 may parse the transaction data signal to obtain the transaction data superimposed thereon and may format the transaction data as necessary. The formatting of the transaction data may be performed by the gateway processor 508 based on the proprietary standards of the gateway processor 508 or an acquiring financial institution 510 associated with the payment transaction. The proprietary standards may specify the type of data included in the transaction data and the format for storage and transmission of the data. The acquiring financial institution 510 may be identified by the gateway processor 508 using the transaction data, such as by parsing the transaction data (e.g., deconstructing into data elements) to obtain an account identifier included therein associated with the acquiring financial institution 510. In some instances, the gateway processor 508 may then format the transaction data based on the identified acquiring financial institution 510, such as to comply with standards of formatting specified by the acquiring financial institution 510. In some embodiments, the identified acquiring financial institution 510 may be associated with the merchant 506 involved in the payment transaction, and, in some cases, may manage a transaction account associated with the merchant 506.

In step 530, the gateway processor 508 may electronically transmit a data signal superimposed with the formatted transaction data to the identified acquiring financial institution 510. The acquiring financial institution 510 may receive the data signal and parse the signal to obtain the formatted transaction data superimposed thereon. In step 532, the acquiring financial institution may generate an authorization request for the payment transaction based on the formatted transaction data. The authorization request may be a specially formatted transaction message that is formatted pursuant to one or more standards, such as the ISO 8583 standard and standards set forth by a payment processor used to process the payment transaction, such as a payment network. The authorization request may be a transaction message that includes a message type indicator indicative of an authorization request, which may indicate that the merchant 506 involved in the payment transaction is requesting payment or a promise of payment from the issuing financial institution 502 for the transaction. The authorization request may include a plurality of data elements, each data element being configured to store data as set forth in the associated standards, such as for storing an account number, application cryptogram, transaction amount, issuing financial institution 502 information, etc.

In step 534, the acquiring financial institution 510 may electronically transmit the authorization request to a transaction processing server 512 for processing. The transaction processing server 512 may be comprised of one or more computing devices as part of a payment network configured to process payment transactions. In some embodiments, the authorization request may be transmitted by a transaction processor at the acquiring financial institution 510 or other entity associated with the acquiring financial institution. The transaction processor may be one or more computing devices that include a plurality of communication channels for communication with the transaction processing server 512 for the transmission of transaction messages and other data to and from the transaction processing server 512. In some embodiments, the payment network associated with the transaction processing server 512 may own or operate each transaction processor such that the payment network may maintain control over the communication of transaction messages to and from the transaction processing server 512 for network and informational security.

In step 536, the transaction processing server 512 may perform value-added services for the payment transaction. Value-added services may be services specified by the issuing financial institution 502 that may provide additional value to the issuing financial institution 502 or the consumer 504 in the processing of payment transactions. Value-added services may include, for example, fraud scoring, transaction or account controls, account number mapping, offer redemption, loyalty processing, etc. For instance, when the transaction processing server 512 receives the transaction, a fraud score for the transaction may be calculated based on the data included therein and one or more fraud scoring algorithms and/or engines. In some instances, the transaction processing server 512 may first identify the issuing financial institution 502 associated with the transaction, and then identify any services indicated by the issuing financial institution 502 to be performed. The issuing financial institution 502 may be identified, for example, by data included in a specific data element included in the authorization request, such as an issuer identification number. In another example, the issuing financial institution 502 may be identified by the primary account number stored in the authorization request, such as by using a portion of the primary account number (e.g., a bank identification number) for identification.

In step 538, the transaction processing server 512 may electronically transmit the authorization request to the issuing financial institution 502. In some instances, the authorization request may be modified, or additional data included in or transmitted accompanying the authorization request as a result of the performance of value-added services by the transaction processing server 512. In some embodiments, the authorization request may be transmitted to a transaction processor (e.g., owned or operated by the transaction processing server 512) situated at the issuing financial institution 502 or an entity associated thereof, which may forward the authorization request to the issuing financial institution 502.

In step 540, the issuing financial institution 502 may authorize the transaction account for payment of the payment transaction. The authorization may be based on an available credit amount for the transaction account and the transaction amount for the payment transaction, fraud scores provided by the transaction processing server 512, and other considerations that will be apparent to persons having skill in the relevant art. The issuing financial institution 502 may modify the authorization request to include a response code indicating approval (e.g., or denial if the transaction is to be denied) of the payment transaction. The issuing financial institution 502 may also modify a message type indicator for the transaction message to indicate that the transaction message is changed to be an authorization response. In step 542, the issuing financial institution 502 may transmit (e.g., via a transaction processor) the authorization response to the transaction processing server 512.

In step 544, the transaction processing server 512 may forward the authorization response to the acquiring financial institution 510 (e.g., via a transaction processor). In step 546, the acquiring financial institution may generate a response message indicating approval or denial of the payment transaction as indicated in the response code of the authorization response, and may transmit the response message to the gateway processor 508 using the standards and protocols set forth by the gateway processor 508. In step 548, the gateway processor 508 may forward the response message to the merchant 506 using the appropriate standards and protocols. In step 550, assuming the transaction was approved, the merchant 506 may then provide the products purchased by the consumer 504 as part of the payment transaction to the consumer 504.

In some embodiments, once the process 500 has completed, payment from the issuing financial institution 502 to the acquiring financial institution 510 may be performed. In some instances, the payment may be made immediately or within one business day. In other instances, the payment may be made after a period of time, and in response to the submission of a clearing request from the acquiring financial institution 510 to the issuing financial institution 502 via the transaction processing server 502. In such instances, clearing requests for multiple payment transactions may be aggregated into a single clearing request, which may be used by the transaction processing server 512 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 540), the transaction processing server 512 may be configured to perform authorization of transactions on behalf of the issuing financial institution 502. Such actions may be referred to as "stand-in processing," where the transaction processing server "stands in" as the issuing financial institution 502. In such instances, the transaction processing server 512 may utilize rules set forth by the issuing financial institution 502 to determine approval or denial of the payment transaction, and may modify the transaction message accordingly prior to forwarding to the acquiring financial institution 510 in step 544. The transaction processing server 512 may retain data associated with transactions for which the transaction processing server 512 stands in, and may transmit the retained data to the issuing financial institution 502 once communication is reestablished. The issuing financial institution 502 may then process transaction accounts accordingly to accommodate for the time of lost communication.

In another example, if the transaction processing server 512 is unavailable for submission of the authorization request by the acquiring financial institution 510, then the transaction processor at the acquiring financial institution 510 may be configured to perform the processing of the transaction processing server 512 and the issuing financial institution 502. The transaction processor may include rules and data suitable for use in making a determination of approval or denial of the payment transaction based on the data included therein. For instance, the issuing financial institution 502 and/or transaction processing server 512 may set limits on transaction type, transaction amount, etc. that may be stored in the transaction processor and used to determine approval or denial of a payment transaction based thereon. In such instances, the acquiring financial institution 510 may receive an authorization response for the payment transaction even if the transaction processing server 512 is unavailable, ensuring that transactions are processed and no downtime is experienced even in instances where communication is unavailable. In such cases, the transaction processor may store transaction details for the payment transactions, which may be transmitted to the transaction processing server 512 (e.g., and from there to the associated issuing financial institutions 502) once communication is reestablished.

In some embodiments, transaction processors may be configured to include a plurality of different communication channels, which may utilize multiple communication cards and/or devices, to communicate with the transaction processing server 512 for the sending and receiving of transaction messages. For example, a transaction processor may be comprised of multiple computing devices, each having multiple communication ports that are connected to the transaction processing server 512. In such embodiments, the transaction processor may cycle through the communication channels when transmitting transaction messages to the transaction processing server 512, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 510 may identify that an authorization request involves an issuing financial institution 502 (e.g., via the bank identification number included in the transaction message) for which no value-added services are required. The transaction processor at the acquiring financial institution 510 may then transmit the authorization request directly to the transaction processor at the issuing financial institution 502 (e.g., without the authorization request passing through the transaction processing server 512), where the issuing financial institution 502 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 512 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 508, acquiring financial institution 510, etc.) for processing using this advanced network, and to quickly and efficiently receive a response regarding the ability for a consumer 504 to fund the payment transaction.

Techniques consistent with the present disclosure provide, among other features, systems and methods for authorization of multiple transactions using a single authorization process. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for authorization of multiple transactions using a single authentication process, comprising:

receiving, by a processing device from a first device associated with a user, (i) user credentials associated with the user for verifying an identity of the user, (ii) a unique identifier associated with a second device associated with the user, and (iii) one or more restrictions associated with and to be imposed on an authorized device before conducting a future transaction, wherein the user credentials, the unique identifier, and the one or more restrictions are input by the user on a user interface on the first device;

determining, by the processing device, that the user is an authorized user based on the user credentials associated with the user;

authorizing, by the processing device and based on the determined authorization of the user and the unique identifier received from the first device, the second device as an authorized transaction device for one or more future electronic transactions; and transmitting, by the processing device to the authorized transaction device, (i) previously stored payment card information, the stored payment card information being associated with a user account of the authorized user for electronic transactions initiated at the authorized transaction device, and (ii) information comprising the one or more restrictions received from the first device to be imposed on the authorized transaction device, wherein responsive to the one or more restrictions being met and prior to the authorized transaction device conducting a future electronic transaction, causing deauthorization of the second device as the authorized transaction device, wherein the deauthorization causes disassociation of the second device from the one or more restrictions previously associated with the second device and from the payment card information associated with the user account of the authorized user, which prevents the second device from conducting the future electronic transaction using the payment card information.

2. The method of claim 1, wherein the one or more restrictions include at least one of:

transactions must be within a time limit on any future authorization from authorizing the authorization transaction device, transactions limited to one or more merchants that the authorized transaction device is authorized to conduct transactions with, transactions must be equal to or less than a maximum amount per transaction that the user specifies, a maximum number of transactions that the authorized transaction device can initiate in a given time frame, and a maximum total amount of a plurality of transactions that the authorized transaction device can initiate within a time limit.

3. The method of claim 1, wherein the deauthorization further causes deletion of the payment card information at the authorized transaction device.

4. The method of claim 1, further comprising causing display of authorization details including at least one of:
- an amount of time left for the authorized transaction device to initiate transactions,
- a number of transactions left that the authorized transaction device can initiate,
- one or more merchants that the authorized transaction device is authorized to conduct transactions with, and
- a maximum amount per transaction that the authorized transaction device can initiate.

5. The method of claim 1, wherein the second device associated with the user is selected from among one or more available devices that are accessible by the user.

6. The method of claim 1, wherein the user credentials include an account name and a password.

7. A computing device for authorization of multiple transactions using a single authentication process, comprising:
- a receiving device of the computing device configured to receive, from a first device associated with a user, (i) user credentials associated with the user for verifying an identity of the user, (ii) a unique identifier associated with a second device associated with the user, and (iii) one or more restrictions associated with and to be imposed on an authorized device before conducting a future transaction, wherein the user credentials, the unique identifier, and the one or more restrictions are input by the user on a user interface on the first device;
- an authenticator device of the computing device configured to determine that the user is an authorized user based on the user credentials associated with the user;
- an authorizer device of the computing device configured to authorize, based on the determined authorization of the user and the unique identifier received from the first device, the second device as an authorized transaction device for one or more future electronic transactions; and
- a data signal generator device of the computing device configured to transmit, to the authorized transaction device, (i) previously stored payment card information, the stored payment card information being associated with a user account of the authorized user for electronic transactions initiated at the authorized transaction device, and (ii) information comprising the one or more restrictions received from the first device to be imposed on the authorized transaction device, wherein responsive to the one or more restrictions being met and prior to the authorized transaction device conducting a future electronic transaction, causing deauthorization of the second device as the authorized transaction device, wherein the deauthorization causes disassociation of the second device from the one or more restrictions previously associated with the second device and from the payment card information associated with the user account of the authorized user, which prevents the second device from conducting the future electronic transaction using the payment card information.

8. The device of claim 7, wherein the one or more restrictions include at least one of:
- transactions must be within a time limit on any future authorization from authorizing the authorized transaction device,
- transactions limited to one or more merchants that the authorized transaction device is authorized to conduct transactions with,
- transactions must be equal to or less than a maximum amount per transaction that the user can specify,
- a maximum number of transactions that the authorized transaction device can initiate in a given time frame, and
- a maximum total amount of a plurality of transactions that the authorized transaction device can initiate within a time limit.

9. The device of claim 7, wherein the deauthorization further causes deletion of the payment card information at the authorized transaction device.

10. The device of claim 7, wherein the second device associated with the user is selected from among one or more available devices that are accessible by the user.

* * * * *